(12) United States Patent
Anderson (10) Patent No.: US 10,815,080 B2
(45) Date of Patent: Oct. 27, 2020

(54) AUTOMATIC TRUCK LOADING AND UNLOADING SYSTEM

(71) Applicant: OMNITRACS, LLC, Dallas, TX (US)

(72) Inventor: Julie Anderson, Wayzata, MN (US)

(73) Assignee: OMNITRACS, LLC, Dallas, TX (US)

( * ) Notice: Subject to any disclaimer, the term of this patent is extended or adjusted under 35 U.S.C. 154(b) by 0 days.

(21) Appl. No.: 15/404,003

(22) Filed: Jan. 11, 2017

(65) Prior Publication Data
US 2018/0194575 A1 Jul. 12, 2018

(51) Int. Cl.
| | | |
|---|---|---|
| *B65G 67/04* | (2006.01) | |
| *B65G 67/02* | (2006.01) | |
| *G06Q 10/08* | (2012.01) | |
| *B65G 47/02* | (2006.01) | |
| *B65G 1/16* | (2006.01) | |
| *B65G 1/04* | (2006.01) | |
| *G05B 19/418* | (2006.01) | |
| *G06Q 10/06* | (2012.01) | |
| *G06Q 50/28* | (2012.01) | |
| *G06K 9/00* | (2006.01) | |
| *G06K 9/20* | (2006.01) | |
| *G01C 21/00* | (2006.01) | |

(52) U.S. Cl.
CPC .......... *B65G 67/04* (2013.01); *B65G 1/0492* (2013.01); *B65G 1/16* (2013.01); *B65G 47/02* (2013.01); *B65G 67/02* (2013.01); *G05B 19/41895* (2013.01); *G06K 9/00832* (2013.01); *G06K 9/20* (2013.01); *G06Q 10/06* (2013.01); *G06Q 10/08* (2013.01); *G06Q 10/083* (2013.01); *G06Q 50/28* (2013.01); *B65G 2203/046* (2013.01); *G01C 21/005* (2013.01); *G05D 2201/0216* (2013.01)

(58) Field of Classification Search
CPC ... B65G 67/02; B65G 67/04; G05B 19/41895
See application file for complete search history.

(56) References Cited

U.S. PATENT DOCUMENTS

| | | |
|---|---|---|
| 5,869,819 A | 2/1999 | Knowles et al. |
| 6,972,682 B2 | 12/2005 | Lareau et al. |

(Continued)

OTHER PUBLICATIONS

International Search Report and Written Opinion dated Aug. 23, 2018 issued in corresponding International Application No. PCT/US2018/013157.

(Continued)

*Primary Examiner* — Thomas Randazzo
(74) *Attorney, Agent, or Firm* — Arent Fox LLP (57) ABSTRACT

The present disclosure provides an automatic loading and unloading system that is adaptable for an array of freight sizes, trucks and/or trailers. In some examples, the automatic loading and unloading may inventory the parcels scheduled for delivery, identify the dimensions of the parcels, and plot a loading configuration that maximizes the use of the truck or trailer. Based on the plotting, the automatic loading and unloading system may direct the automated guided vehicles (e.g., automatic forklifts) to the parcels scheduled for delivery. The automated guided vehicles may utilize the information received from the automatic loading and unloading system to identify a route from the parcel's storage location in the warehouse, for example, to the plotted position in the truck or trailer.

17 Claims, 7 Drawing Sheets

(56) References Cited

U.S. PATENT DOCUMENTS

| | | | |
|---|---|---|---|
| 9,315,344 B1* | 4/2016 | Lehmann | B65B 59/003 |
| 9,457,970 B1* | 10/2016 | Zevenbergen | B65G 67/02 |
| 9,486,921 B1* | 11/2016 | Straszheim | B25J 9/1687 |
| 9,688,489 B1* | 6/2017 | Zevenbergen | B65G 67/20 |
| 9,707,682 B1* | 7/2017 | Konolige | G06K 9/4604 |
| 2005/0046567 A1* | 3/2005 | Mortenson | G08B 21/18 |
| | | | 340/539.13 |
| 2008/0167817 A1* | 7/2008 | Hessler | G01C 21/005 |
| | | | 701/514 |
| 2009/0114575 A1* | 5/2009 | Carpenter | B07C 7/005 |
| | | | 209/584 |
| 2014/0136429 A1* | 5/2014 | Psihos | G06Q 10/083 |
| | | | 705/317 |
| 2015/0073588 A1* | 3/2015 | Priebe | B65G 57/00 |
| | | | 700/217 |
| 2015/0210199 A1* | 7/2015 | Payne | G06Q 10/08 |
| | | | 701/1 |
| 2015/0235165 A1* | 8/2015 | Miette | G06Q 10/083 |
| | | | 705/337 |
| 2015/0274447 A1* | 10/2015 | McCollum | B25J 15/10 |
| | | | 414/792.6 |
| 2016/0090248 A1* | 3/2016 | Worsley | B65G 61/00 |
| | | | 414/398 |
| 2016/0189087 A1* | 6/2016 | Morton | G06Q 10/083 |
| | | | 705/337 |
| 2016/0224930 A1* | 8/2016 | Kadaba | G06Q 10/083 |
| 2016/0282126 A1* | 9/2016 | Watts | H03K 19/17768 |
| 2016/0288330 A1* | 10/2016 | Konolige | H04N 13/239 |
| 2017/0043967 A1* | 2/2017 | Walford | B65G 69/2805 |
| 2017/0107056 A1* | 4/2017 | Kadaba | B60P 3/007 |
| 2017/0190054 A1* | 7/2017 | McCollum | B25J 15/0616 |
| 2017/0351268 A1* | 12/2017 | Anderson | G08G 1/04 |
| 2018/0043547 A1* | 2/2018 | Hance | G06Q 10/0875 |
| 2018/0096289 A1* | 4/2018 | Terwilliger | G06Q 10/083 |

OTHER PUBLICATIONS

Piyaii Das, et al: "RFID for Indoor Position Determination: Wireless Networks and Security Proceedings of the Second International Conference on Advanced Computing, Networking and Infomatics (ICANI—2014)" In: Proceedings of the International Conference on CIDIN, Computational Intelligence in Data Mining—vol. 2. Smart Innovation , Systemes and Technologies; Dec. 20-21, 2014; IN: Smart Innovation, Systems and Technologies, vol. 32. Jan. 1, 2014, Springer, New Delhi, India XP055698514, ISSN: 2190-3018, ISBN: 978-81-322-2207-1 vol. 28, pp. 561-567, DOI:10.1007/978-3-319-07350-7_62, abstract, p. 6, line 7-p.8.

Extended European Search Report issued in corresponding European Patent Application No. 18739292.3 dated Jun. 4, 2020.

* cited by examiner

AUTOMATIC TRUCK LOADING AND UNLOADING SYSTEM

BACKGROUND

In freight transportation, manual loading and unloading of trucks and trailers can be a resource intensive endeavor. In some examples, the loading and unloading process may take as much as couple of hours to complete. Thus, in addition to the manpower resources that are expended in loading and/or unloading a truck, the downtime of the truck sitting idle at a loading dock may contribute to higher transportation costs (e.g., paying a truck driver to sit idle while the truck or trailer is being loaded/unloaded).

To address such concerns, trucking fleets have turned to Automated Truck Loading Systems (ATLS) that can be used in the material handling industry to automate the loading or unloading of trucks and trailers with product either on or without pallets, slip sheets, racks, containers, using engineered conveyor belt systems that are integrated into trailers. However, such conventional ATLS systems are generally limited to loading uniform size freights for specially manufactured trucks or trailers that are adapted for ATLS (such as with a standard interior height and width, a flat floor, etc.).

While such a system may be suitable, for example, for a customer that is predictably delivering same size freight in a specifically equipped truck or trailer (e.g., beverage manufacturer that is constantly delivering the same size of containers on same size trucks), such a system may not be practical for a delivery company that is servicing customers that may have varying size freights. Moreover, when the same truck is shared by multiple customers (e.g., in instances when the entire truck is not loaded by a single customer, but instead accepts load from multiple customers), the conventional ATLS are not flexible to partially load/unload the truck or trailer.

SUMMARY

The present disclosure provides an automatic loading and unloading system that is adaptable for an array of freight sizes, trucks and/or trailers. In some examples, the automatic loading and unloading may inventory the parcels scheduled for delivery, identify the dimensions of the parcels, and plot a loading configuration that maximizes the use of the truck or trailer. Based on the plotting, the automatic loading and unloading system may direct the automated guided vehicles (e.g., automatic forklifts) to the parcels scheduled for delivery. The automated guided vehicles may utilize the information received from the automatic loading and unloading system to identify a route from the parcel's storage location in the warehouse, for example, to the plotted position in the truck or trailer. In some aspects, the automatic loading and unloading system may also identify the entry angle that would allow the automated guided vehicles to enter the trailer with the parcel.

In one example, a method for automated loading and unloading of a trailer is disclosed. The method may include receiving, at a network entity, inventory of one or more parcels scheduled for delivery. The method may further include determining, at the network entity, a configuration of the trailer and determining a placement location for each of the one or more parcels in the trailer based on the configuration of the trailer. The one or more parcels may include a first parcel of a first size and a second parcel of a second size that is different from the first size. The method may further include controlling an automated guide vehicle to load each of the one or more parcels into each placement location, or to unload each of the one or more parcels from each placement location.

In another example, a method for controlling an automated guide vehicle is disclosed. The method may include receiving, at the automated guide vehicle, plot information from a network entity and determining a storage location of a parcel based on the plot information. The method may further include controlling the automated guide vehicle to the storage location of the parcel and transporting the parcel from the storage location of the parcel to a loading location of the parcel based on the plot information that maps of one or more parcels in the trailer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

As discussed above, conventional ATLS systems are generally limited to loading uniform size freights for specially manufactured trucks or trailers that are adapted for ATLS. Such systems may not be practical for a delivery company that is servicing customers that may have varying size freights and/or varying size or loading (e.g., interior) volumes of trailers. Moreover, when the same truck is shared by multiple customers, the conventional ATLS are not flexible to partially load/unload the truck or trailer.

Aspects of the present disclosure provide an automatic loading and unloading system that is adaptable for an array of freight (e.g., parcel) sizes and/or truck or trailer sizes or configurations.

In an example of loading a truck or trailer, the automatic loading and unloading system may inventory the parcels scheduled for delivery, identify the dimensions of the parcels, and determine a loading configuration that maximizes a loading or unloading objective. Suitable examples of the loading or unloading objective include, but are not limited to, an objective that maximizes the use (e.g., maximizes filling the loading volume) of the truck or trailer, an objective that distributes the weight of the parcels in a given manner, and/or an objective that maximizes an efficiency in loading and/or unloading the truck or trailer (e.g., a first-in, last-out ("FILO") loading plan).

For example, in an aspect, the loading configuration may include a placement location within the loading volume of the truck or trailer. The placement location may be, in some examples, a multi-axis position within the loading volume, such as an x-axis (left-to-right) position, a y-axis (back-to-front) position, and a z-axis (bottom (floor)-to-top (ceiling or highest point in the loading volume) position. In other examples or in combination with the multi-axis position, the placement location may be a relative position based on a reference point (e.g., a wall, a corner, a floor, and/or a top or side of another parcel) in the loading volume, or based on a location of another parcel. In yet other examples or in combination with the multi-axis position and/or the relative location, the loading volume may be divided up into two or more loading columns extending from the front to the back of the loading volume, and the placement position may be a relative location, front-to-back and a relative height, within a respective loading column. In some cases, the height of the placement location may be defined based on features of the truck or trailer, such as the floor or the ceiling or highest point in the loading volume, or based on dimensions of another parcel, such as the top of another parcel at the same front-to-back and the same side-to-side position. In further examples, the automatic loading and unloading system may also identify packages that may be fragile, and direct the automated guided vehicles to insert artificial dividers between the packages in order to protect the fragile package.

In any case, continuing with the loading example, based on the loading configuration and respective placement location, the automatic loading and unloading system may direct one or more automated guided vehicles (e.g., automatic forklifts or automatic loading or unloading devices) to the parcels scheduled for delivery. The automated guided vehicles may utilize the information received from the automatic loading and unloading system to identify a route, for example, from a storage location of the parcel in a warehouse to the placement location in the truck or trailer. In some aspects, the automatic loading and unloading system may also identify an entry position or entry route (e.g., orientation and an angle of entry) that would allow the automated guided vehicles to enter the trailer with the parcel.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
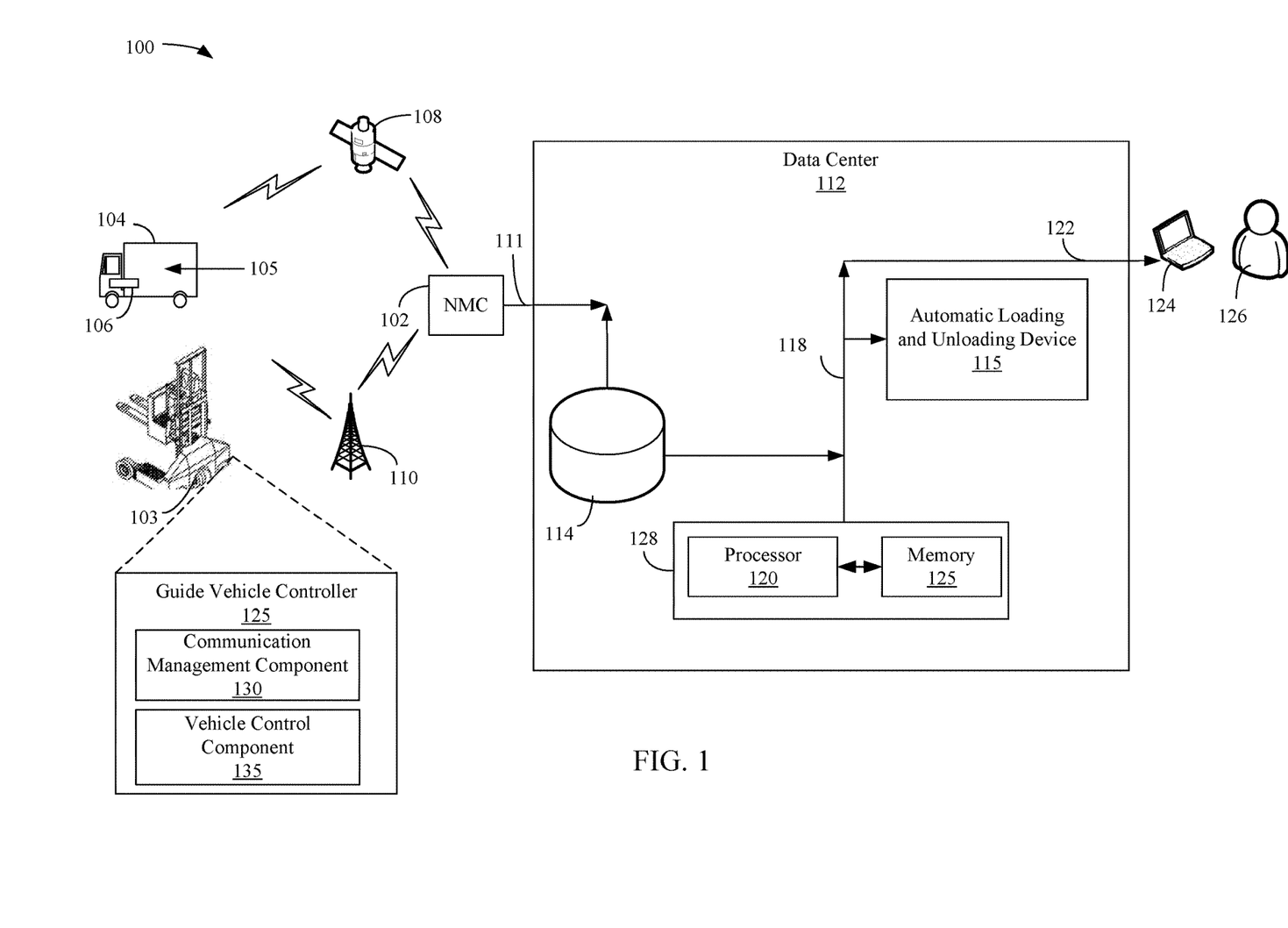
FIG. 1 is a schematic diagram of an example of a system for collecting, analyzing and presenting loading information from a network entity, and for autonomously loading or unloading a vehicle, in accordance with aspects of the present disclosure.

Referring to FIG. 1, in an aspect, a system 100 includes components for collecting, analyzing, and determining loading information or unloading information from a network entity (e.g., data center 112), and for causing automated loading or unloading of a vehicle. In an aspect, system 100 can comprise a network management center (NMC) 102 configured to communicate with one or more automated guide vehicles 103 and one or more vehicles 104, such as a truck or trailer having a loading volume 105 to be loaded or unloaded with parcels. In an aspect, the system 100 includes fleets of vehicles 104, each fleet having at least one vehicle. However, typically, a fleet could include many tens, hundreds or thousands of vehicles. In some implementations, each of the vehicles 104 can include a mobile computing platform (MCP) 106, such as but not limited to an INTELLIGENT VEHICLE GATEWAY (IGV) device sold by OMNITRACS LLC of Dallas, Tex., an XRS logging device, an OmniOne device, or any other type of electronic logging device (ELD) or any type of computer device, configured to collect and transmit data associated with the operation of the vehicle 104 to the NMC 102. In some examples, the fleet of vehicles 104 may include trucks and trailers of various sizes and configurations having different loading volumes and/or different capacities and that can accommodate an array of differently sized and shaped loads (e.g., parcels). The one or more automated guide vehicles 103 may operate based on information received from the network entity (e.g., automatic loading and unloading device 115) that is part of the data center 112.

In some aspects with respect to automated loading of vehicle 104, the automated guide vehicles 103 may be provided information regarding the location of one or more parcels, e.g., stored in a warehouse, based on tracking information of the parcels (via one or more tracking identifiers, such as a radio-frequency identification (RFID) tags imbedded in the one or more parcels). The automated guide vehicles 103 may include a guide vehicle controller 125 to control the communication and operation of the automated guide vehicle 103 based on information received from the network entity.

In accordance with the present disclosure, the MCP 106 of vehicle 104 may transmit to the automatic loading and unloading device 115 the capacity and dimensions (e.g., loading volume) of the trailer that is attached to the vehicle 104. Each trailer may have unique dimensions and obstacles therein (e.g., tire inlay location in the floor of the loading volume) that may affect the loading plan implemented by the automatic loading and unloading device 115. For example, a first trailer may have unique obstacles in the loading volume that impact the loading of the one or more parcels that are not present in a second trailer. As such, the automatic loading and unloading device 115 considers the capacity and mapping of the loading volume of the trailer when implementing the process of determining the loading configuration. One non-limiting example of mapping the trailer may include utilizing a three-dimensional (3-D) imaging device to capture high-quality 3-D images of the trailer. The 3-D images could be uploaded to the automatic loading and unloading device 115 in order to determine the loading configuration. Thus, the dimensions of the vehicle 104 and/or associated trailer can be entered manually (e.g., by a user) or transmitted to the network entity based on a completed 3-D scan from a 3-D imagine device.

Accordingly, as an example only, each vehicle 104 may be in bi-directional communication with a network management center (NMC) 102 over at least one communication channel. In the example shown in FIG. 1, each vehicle 104 is in bi-directional communication with the NMC 102 over at least one of a terrestrial-based system 110 (e.g., GSM, CDMA, TDMA, WCDMA, EDGE, OFDM, GPRS, EV-DO, WiFi, Bluetooth, WiMAX, UWB, PAN, and others) or a satellite-based communication system 108. Depending on many factors, data may be exchanged with the vehicles 104 using any combination of the terrestrial-based communication system 110 and the satellite communication system 108.

As discussed above, many different types of data are collected and transferred from the vehicles 104 to the NMC 102. Examples of such data include, but are not limited to, vehicle capabilities, the trailer capacity and dimensions (e.g., loading volume), the scheduled delivery route, position data, and many other types of data. In some aspects, data collected from the vehicles 104 is processed by the NMC 102. The NMC 102 can be thought of as a data clearinghouse that receives all data that is transmitted to and received from the vehicles 104.

The system 100 also includes a data center 112, which may be part of or in communication with NMC 102. The data center 112 illustrates one possible implementation of a central repository for all of the data received from each of the vehicles 104. As an example, as mentioned above, many different types of data are transmitted from the vehicles 104 to the NMC 102. In the case where data center 112 is in communication with NMC 102, the data may be transmitted via connection 111 to the data center 112. The connection 111 may comprise any wired or wireless dedicated connection, a broadband connection, or any other communication channel configured to transport the data.

In an aspect, the data center 112 may include a data warehouse 114 for receiving the data from vehicles 104, such as data relating to parcel location and the information (e.g., loading volume and configuration) associated with each vehicle 104. In an aspect, for example, data center 112 may include any number of application servers and data stores, where each may be associated with a separate fleet and/or driver management or performance data. In an aspect, each application server and data store may include a processor, memory including volatile and non-volatile memory, operational software, a communication bus, an input/output mechanism, and other operational systems. In some examples, the data center 112 may be an example of MCP interworking server (MIS) configured to manage one or more customer fleets. Thus, in some aspects, the MIS may manage and configure one or more applications associated with the vehicles 104. For example only, a first application server may be a services portal (SP) server that receives, for example, messaging and positioning (M/P) data and/or location delivery efficiency (LDE) data from each of the vehicles 104. Another application server, for example only, may include one or more servers related to safety and compliance, such as a quick deployment center (QDC) server that receives, for example, critical event (CE) data from each of the vehicles 104, or such as an hours of service (HOS) server that receives data related to, for example, duty status (DS) data such as the number of hours that a driver operates a vehicle 104. Further, for example, another application server may be a fuel cost server that receives, for example, vehicle and driver performance data related to fuel usage and/or cost from each of the vehicles 104.

In the present disclosure, the data center 112 may also include an automatic loading and unloading device 115 for determining the loading configuration and placement locations of the one or more parcels in the truck or trailer associated with the vehicle 104 based on the respective dimensions of the parcels and the truck or trailer. In some examples, the determining of the loading configuration of the one or more parcels may be calculated in order to maximize the usage of the capacity of the trailer for carrying parcels. In other examples, the automatic loading and unloading device 115 may also take into consideration the delivery schedule during the plotting process. Particularly, the automatic loading and unloading device 115 may organize the parcels in the trailer such that parcels scheduled for the first delivery are loaded in the rear of the trailer and the last delivery is loaded at the front of the trailer. Thus, the automated guide vehicles 103 may receive routes that guide them to pick-up parcels and deliver and load them into a placement location in vehicle 104 based on the loading configuration.

In some aspects, with respect to automated unloading of vehicle 104, automatic loading and unloading device 115 or NMC 102 may transmit the loading configuration of one or more automated guide vehicles 103 at a delivery location. The automated guide vehicle 103 may unload the parcels from the respective placement locations based on the loading configuration. For example, the process of unloading the vehicle 104 may be the opposite of the process of loading the vehicle 104.

Additionally or alternatively, an automatic loading and unloading device 115 may implement a set of routines that may receive data from data warehouse 114 over connection 118. The automatic loading and unloading device 115 may capture, manipulate, and provide this data in a usable format, for example, over connection 122 for display on a terminal device 124. The terminal device 124 can be a user interface portal, a web-based interface, a personal computer (PC), a laptop, a personal data assistant (PDA), a dedicated terminal, a dumb terminal, or any other device over which a user 126, such as a manager or operator responsible for monitoring a fleet of vehicles 104, the one or more automated guide vehicles 103 and the parcels (not shown). In an aspect, an automatic loading and unloading device 115 includes an analysis engine defined by or operating via an execution system 128, for example, connected via a system bus 118. In an aspect, the execution system 128 includes a processor 120 and a memory 125. The memory 125 can store the routines that are associated with automatic loading and unloading device 115. In an aspect, the processor 120 can execute the stored routines to implement the functionality of the automatic loading and unloading device 115 that are described herein. In another aspect, the functionality of automatic loading and unloading device 115 as described herein may be implemented in one or more hardware or firmware processor modules of processor 120. Although shown as residing within the data center 112, the execution system 128 may reside elsewhere, and may be implemented as a distributed system in which the processor 120 and the memory 125 are located in different places.

Figure 2:
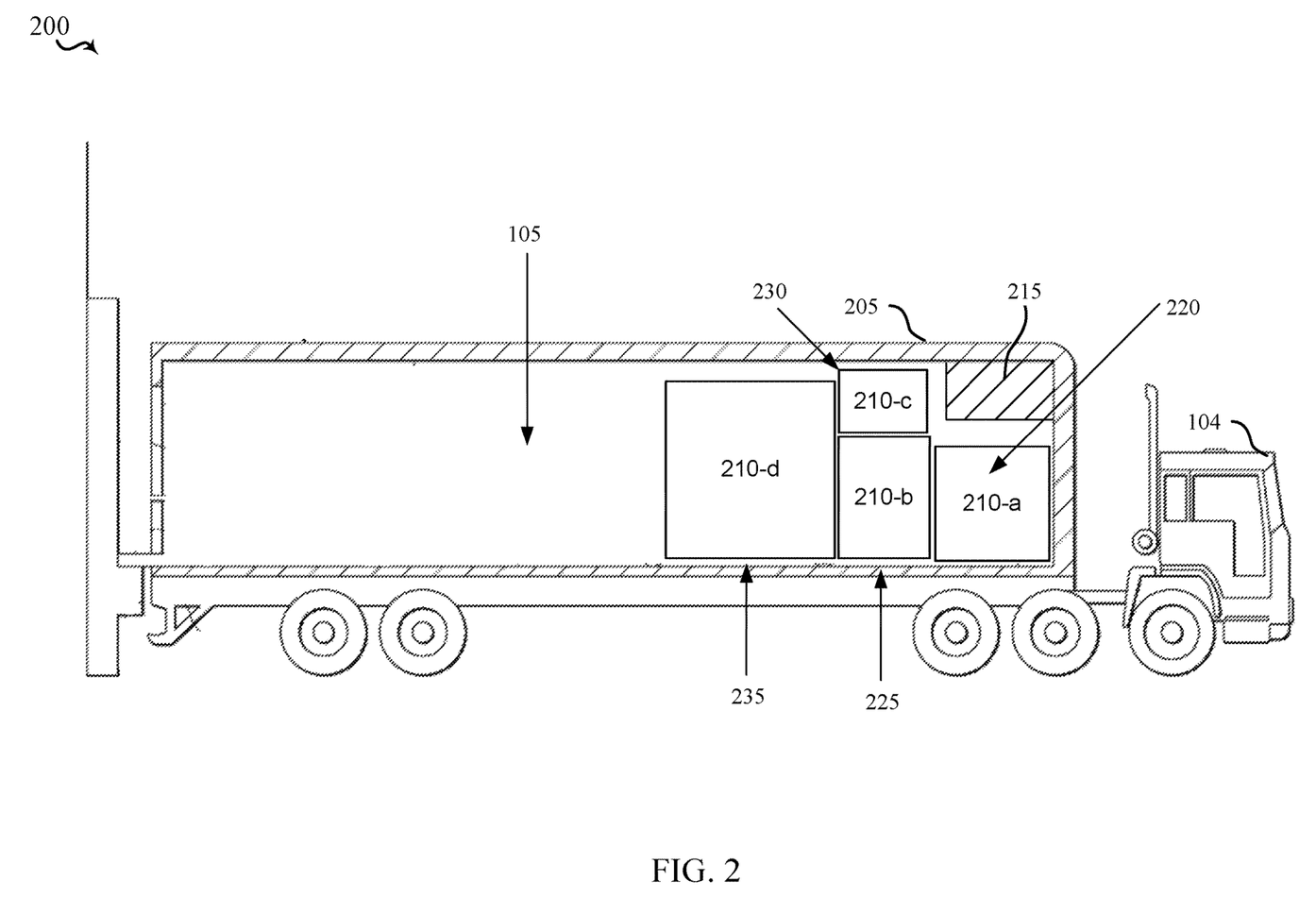
FIG. 2 is a partially cross-sectional, side view of trailer of a vehicle including an example of a portion of a loading configuration for loading parcels in a vehicle in accordance with aspects of the present disclosure.

FIG. 2 is an example of loading (or unloading) configuration 200 implemented by the network entity for automatic loading and unloading of one or more parcels 210 within the loading volume inside the trailer cabin 205 of a vehicle 104. In some examples, prior to loading of the trailer 205, the automatic loading and unloading device 115 may determine, e.g., map/plot, the placement locations of the one or more parcels 210 to meet a loading and/or unloading objective, e.g., an objective that maximizes filling the capacity of the trailer 205. To that end, the network entity (e.g., automatic loading and unloading device 115) may receive information associated with the size and dimensions of the various parcels scheduled for delivery. The network entity may also receive information from the MCP 106 of the vehicle 104 that identifies the capabilities and capacity of the trailer 205. For example, the trailer information may include not only the dimensions of the trailer 205, but also identify any obstacles 215 that impact the loading of the one or more parcels 210. Suitable examples of obstacle 215 may include, but are not limited to, a wheel well extending up from a floor of the trailer cabin 205, or any wall or surface or structure that extends into or defines a discontinuity in the loading volume.

In the example of FIG. 2, the automatic loading and unloading device 115 may recognize the change in clearance based on the obstacle 215. As such the automatic loading and unloading device 115 may select a first parcel 210-*a* having a first size, including a height that fits within the clearance defined by obstacle 215, to be loaded at a first placement location 220 that is positioned under obstacle 215. Thereafter, the automatic loading and unloading device 115 may identify a second placement location 225 for a second parcel 210-*b*. The size and dimensions of the second parcel 210-*b* may be different from the first parcel 210-*a*. Because the automatic loading and unloading device 115 has information regarding the dimensions of the trailer cabin 205, the automatic loading and unloading device 115 may identify a third parcel 210-*c* that may be loaded at a third placement location 230 (e.g., a same front-to-back and side-to-side location, but a different height location corresponding to being on top of the second parcel 210-*b*). The fourth parcel 210-*d* may further be loaded at a fourth location 235. Such a loading configuration allows the automatic loading and unloading device 115 to maximize filling the capacity of the trailer 205 with parcels, and such parcels may also be selected and moved into respective placement locations while considering the delivery schedule of the vehicle 104.

Once the automatic loading and unloading device 115 has completed the loading configuration 200 by determining respective placement locations of the one or more parcels 210 in the trailer 205 of the vehicle 104, the automatic loading and unloading device 115 may transmit the loading configuration 200 to the one or more automated guide vehicles 103 to execute the loading. It should be appreciated that while the illustrated example focuses on the "front-to-back" and height placement locations, similar principles disclosed herein may be applied across the width of the cabin 105.

Figure 3:
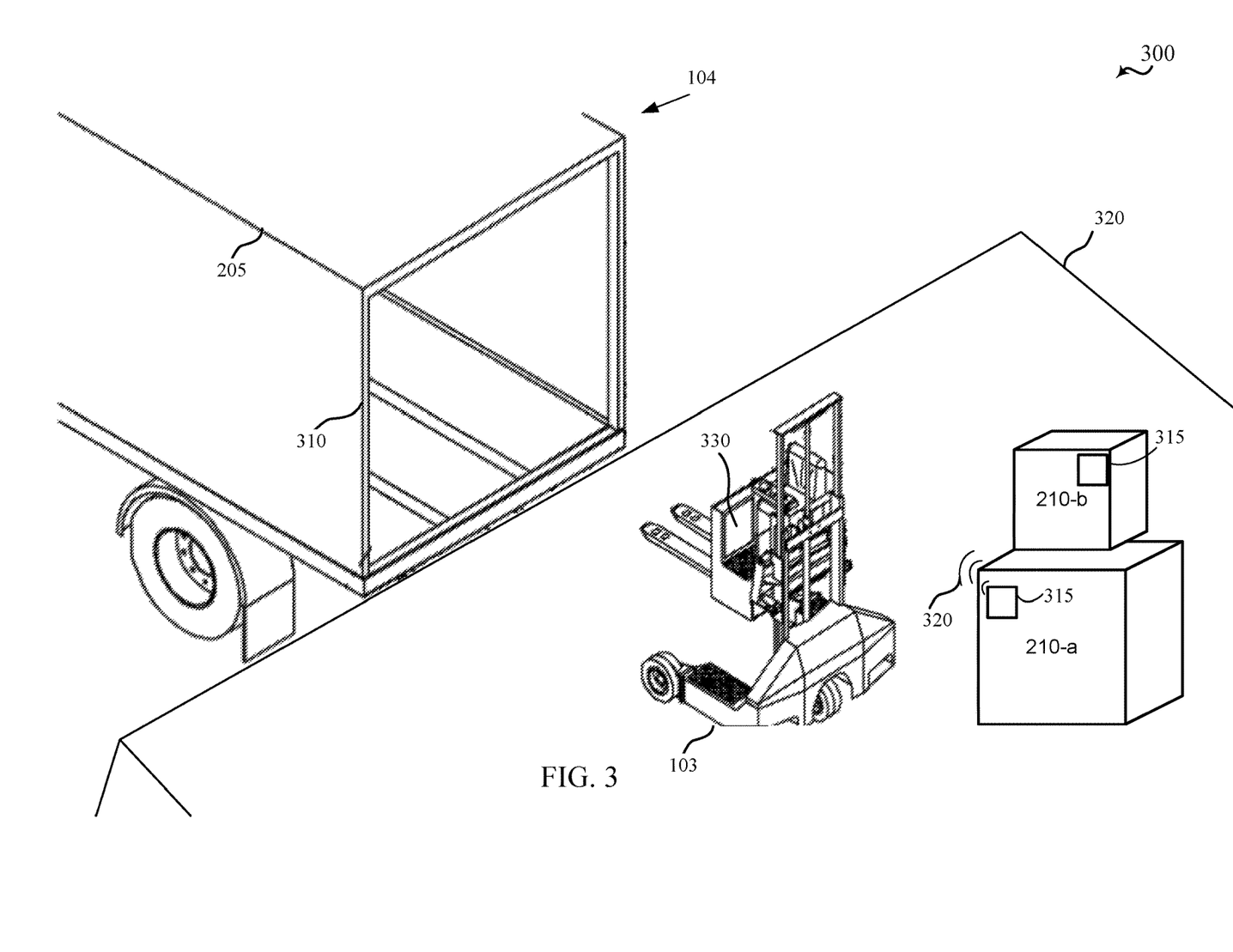
FIG. 3 is a perspective view of an example of a portion of the system that includes a part of the vehicle to be loaded or unloaded, an automated guide vehicle, and one or more parcels for loading or unloading in accordance with aspects of the present disclosure.

FIG. 3 is an example of a loading or unloading system 300, which is a part of system 100 (FIG. 1), and that includes a trailer 205 of vehicle 104, the one or more automated guide vehicles 103 and one or more parcels 210 for loading (or, in another case, unloading) in accordance with aspects of the present disclosure. As discussed above, once the automatic loading and unloading device 115 has identified the placement locations of the one or more parcels 210 within a loading volume of the trailer 205, the loading configuration is transmitted to one or more automated guide vehicles 103 to execute.

The automated guide vehicles 103 may include a communication interface for communicating with the network entity (e.g., NMC 102 and/or the automatic loading and unloading device 115). Additionally or alternatively, each or some combination of the one or more parcels 210 may include a tracking identifier 315 for tracking the location of the parcels 210 through the loading (or unloading) process. Suitable examples of tracking identifier 315 may include, but are not limited to, one or more of a label, a bar code, a quick response (QR) code, a radio frequency identifier tag, a near field communication (NFC) device, or any other mechanism that allows an individual parcel 210 or a group of parcels 210 to be identified and located via visual or radio communication mechanisms. Thus, in some examples, the automated guide vehicle 103 may include one or more parcel identifier devices 330 to identify the location of the one or more parcels 210. Suitable examples of the one or more parcel identifier devices 330 may include, but are not limited to, one or more of: a vision system (e.g., one or more cameras and image recognition software) to read a label, bar code, or QR code; a radio communication system, such as a RFID or NFC transponder and/or reader; and a position/location system, such as a satellite- and/or terrestrial-based geographic positioning system, which may be able to verify that a current location matches a given location for a respective parcel 210. For instance, in an RFID example, based on the information in an RFID signal 320 emitted by the tracking identifier 315 in the form of an RFID tag (in response to a transmission from an RFID transponder that awakens the tag) attached to each parcel 210. For example, the information in the RFID signal 320 may include one or more of an identifier of the parcel, such shipping number, invoice number, bill of lading number, or an order number, a sender name and address, a receiver or destination name and address, a truck or trailer placement location identifier that specifies the placement location, and/or any other information that may identify the parcel 210 and/or the loading or unloading information associated with the parcel 201. Also, in some cases, the one or more parcel identifier devices 330 may further include a device identifier, such as a label that can be visually perceived and/or identifier information that can be exchanged via a wired or wireless communication link, and optionally a communications component (such as a cellular, satellite, WiFi, or Bluetooth modem), in order to identify the automated guide vehicle 103 to other devices (e.g., to NMC 102, the automatic loading and unloading device 115, the trailer 205, another automated guide vehicle 103, or any other device). Thus, in this example, the automated guide vehicle 103 may identify the parcels 210 to collect and move based on the information received in RFID signals.

Further, based on routing information from the automatic loading and unloading device 115, the automated guide vehicles 103 may be routed to the one or more parcels 210, such as being directed to a storage location for pickup. For example, the routing information may include an exact route to the storage location, and/or may include the storage location identified by GPS coordinates. The automated guide vehicles 103 may take a route through a building or stockyard based on the exact route or based on known obstacles between a current location and the location corresponding to the GPS coordinates, and then locate and identify a respective parcel 210 using one or more parcel identifier devices 330.

Additionally, the automatic loading and unloading device 115 may identify the route that the automated guide vehicle 305 may take between the storage location of the one or more parcels 210 and the placement location in the trailer cabin 205. For example, the location of the trailer 205 may be identified by GPS coordinates, and the automated guide vehicles 103 may take a route through a building or stockyard to the location corresponding to the GPS coordinates, and then locate and identify the trailer 205 using one or more parcel identifier devices 330. The trailer 205 may include a corresponding set of one or more parcel identifier devices 330 that can communicate with the one or more parcel identifier devices 330 of the automated guide vehicles 103 to confirm that the parcel 210 is being delivered to the correct trailer 205. Suitable examples of the one or more parcel identifier devices 340 on the trailer 205 may include, but are not limited to, one or more of: a vision system (e.g., one or more cameras and image recognition software) to read a label, bar code, or QR code; a radio communication system, such as a RFID or NFC transponder and/or reader; and a position/location system, such as a satellite- and/or terrestrial-based geographic positioning system, which may be able to verify that a current location matches a given location for a respective parcel 210. Also, in some cases, the one or more parcel identifier devices 340 on the trailer 205 may further include a device identifier, such as a label that can be visually perceived and/or identifier information that can be exchanged via a wired or wireless communication link, and optionally a communications component (such as a cellular, satellite, WiFi, or Bluetooth modem), in order to identify the trailer 205 to other devices (e.g., to NMC 102, the automatic loading and unloading device 115, the trailer 205, another automated guide vehicle 103, or any other device).

Additionally, for example, the one or more parcel identifier devices 340 on the trailer 205 may confirm or perform a position synchronization with the one or more parcel identifier devices 330 of the automated guide vehicle 103 in order to establish a relative alignment between the trailer 205 and the automated guide vehicle 103. In some aspects, the loading configuration and the respective placement location of each parcel 210 defines a relative position within the trailer 205, which can then be accurately determined by the automated guide vehicle 103 after establishing the relative alignment with the trailer 205.

For instance, establishing the relative alignment may include determining a position of the automated guide vehicle 103 relative to one or more reference points on the trailer 205. The reference point(s) may include, but is not limited to, any point in space that can be correlated to a structure (e.g., floor, wall) of the trailer 205. In some cases, for example, the one or more parcel identifier devices 330 of the automated guide vehicle 103 may include a vision system or a wireless communication system that identifies one or more reference points on the trailer 205 (visually or by wireless communications), and determines the relative alignment (for example, by visually resolving the difference in relative positions; or by triangulating a position based on the received signal strength of the wireless signals). In other cases, the one or more parcel identifier devices 340 of the trailer 205 may perform the alignment process. In yet other cases, both of the one or more parcel identifier devices 330 of the automated guide vehicle 103 and the one or more parcel identifier devices 340 of the trailer 205 may work together to determine the relative alignment.

In any case, once the relative alignment between the automated guide vehicle 103 and the trailer 205 is known, then the automated guide vehicle 103 may follow a known route, or may determine a route, between the current location of the automated guide vehicle 103 and a position to which the automated guide vehicle 103 should move in order to be able to place the parcel 210 in the placement location within the trailer 205.

In contrast to conventional systems that utilize engineered conveyor belt systems for loading/unloading and are limited to only one entry route, aspects of the present disclosure provide flexibility to load and unload individual parcels and pallets of different sizes in a side-to-side and/or vertical placement locations in the cabin 310 of the vehicle 104.

It should be appreciated by those of ordinary skill that the techniques described herein are not limited to loading the trailer, but may also be implemented for automatically unloading the trailers without user intervention.

Figure 4A:
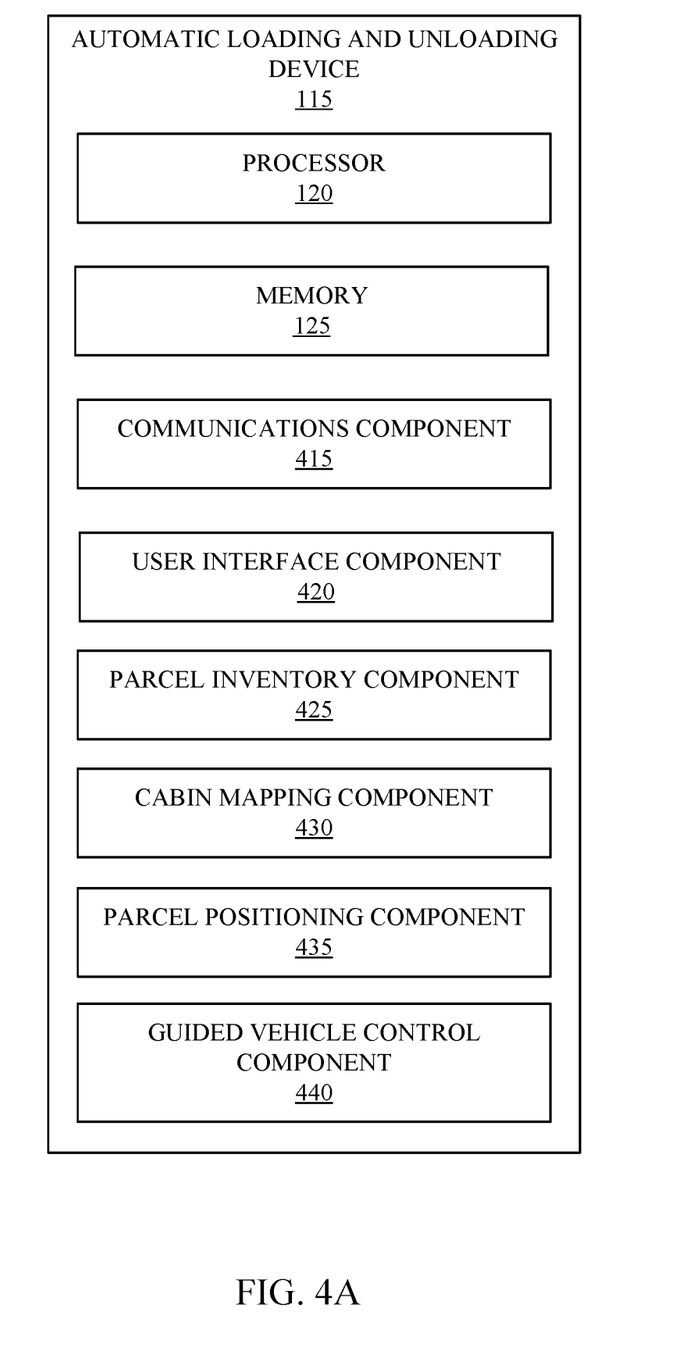
FIG. 4A is a block diagram of an example of an automatic loading and unloading device for determining a loading configuration for loading/unloading parcels in the vehicle, in accordance with various aspects of the present disclosure.

Referring now to FIG. 4A, an example of a hardware implementation for the automatic loading and unloading device 115 that is included on the network entity may include a processor 120 for carrying out one or more processing functions (e.g., method 500) described herein. The processor 120 may include a single or multiple set of processors or multi-core processors. Moreover, the processor 120 can be implemented as an integrated processing system and/or a distributed processing system.

The automatic loading and unloading device 115 may further include memory 125, such as for storing local versions of applications being executed by the processor 120. In some aspects, the memory 125 may be implemented as a single memory or partitioned memory. In some examples, the operations of the memory 125 may be managed by the processor 120. Memory 125 can include a type of memory usable by a computer, such as random access memory (RAM), read only memory (ROM), tapes, magnetic discs, optical discs, volatile memory, non-volatile memory, and any combination thereof. Additionally, the processor 120, and memory 125 may include and execute operating system (not shown).

Further, automatic loading and unloading device 115 may include a communications component 415 that provides for establishing and maintaining communications with one or more parties utilizing hardware, software, and services as described herein. Communications component 415 may carry communications between components on automatic loading and unloading device 115, as well as between the automatic loading and unloading device 115 and external devices, such as the automated guide vehicles located across a communications network and/or devices serially or locally connected to automatic loading and unloading device 115. For example, communications component 415 may include one or more buses, and may further include transmit chain components and receive chain components associated with a transmitter and receiver, respectively, operable for interfacing with external devices.

The automatic loading and unloading device 115 may also include a user interface component 420 operable to receive inputs from a user of the network entity and further operable to generate outputs for presentation to the user. User interface component 420 may include one or more input devices, including but not limited to a touch-sensitive display, a navigation key, a function key, a microphone, a voice recognition component, any other mechanism capable of receiving an input from a user, or any combination thereof. Further, user interface component 420 may include one or more output devices, including but not limited to a display, a speaker, any other mechanism capable of presenting an output to a user, or any combination thereof.

The automatic loading and unloading device 115 may also include parcel inventory component 425 for inventorying each of the one or more parcels scheduled for delivery. The parcel inventory component 425 may include the dimensions of the one or more parcels such that the automatic loading and unloading device 115 is aware of the size and dimensions of each parcel. The automatic loading and unloading device 115 may further include a cabin mapping component 430 that maps a layout of the loading volume, e.g., the inside of the trailer cabin 310, to identify obstacles and unique layout of each trailer. The automatic loading and unloading device 115 may further include a parcel positioning component 435 to determine the loading configuration, including the placement location of the one or more parcels 210 in the loading volume of the vehicle 104, e.g., within the cabin 310, based on the dimensions and size of each parcel 210 and the unique layout of each trailer 205. Based on the loading configuration, the guided vehicle control component 440 may determine a route to guide the one or more automated guided vehicles 103 to the one or more parcels 210 and to further guide the one or more automated guided vehicles 103 to the trailer 205 and/or to the respective placement locations of the parcels 210 on the trailer 205.

Figure 4B:
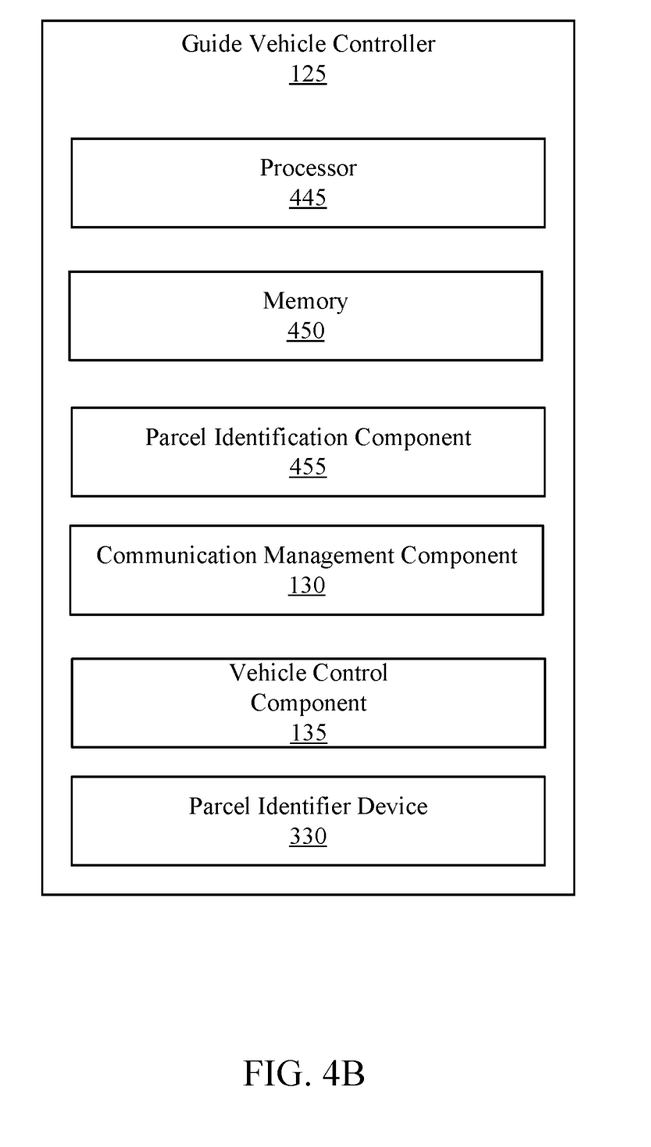
FIG. 4B is a block diagram of an example of a hardware implementation for a guide vehicle controller for controlling the automated guide vehicle in accordance with various aspects of the present disclosure is described.

Referring now to FIG. 4B, an example of a hardware implementation for the guide vehicle controller 125 of the automated guide vehicle 103 includes a processor 445 for carrying out one or more processing functions (e.g., method 600) described herein. The processor 445 may include a single or multiple set of processors or multi-core processors. Moreover, the processor 445 can be implemented as an integrated processing system and/or a distributed processing system.

The guide vehicle controller 125 may further include memory 450, such as for storing local versions of applications being executed by the processor 445. In some aspects, the memory 450 may be implemented as a single memory or partitioned memory. In some examples, the operations of the memory 450 may be managed by the processor 445. Memory 450 can include a type of memory usable by a computer, such as random access memory (RAM), read only memory (ROM), tapes, magnetic discs, optical discs, volatile memory, non-volatile memory, and any combination thereof.

Further, the guide vehicle controller 125 may include the one or more parcel identifier devices 330 for identifying the location of the one or more parcels 210, e.g., by detecting the tracking identifier 315, and/or the trailer 205 and/or the placement location of each parcel 210. The guide vehicle controller 125 may also include communication management component 130 that provides for establishing and maintaining communications with one or more parties utilizing hardware, software, and services as described herein. Communication management component 130 may carry communications between components on automatic loading and unloading device 115 and the automated guide vehicle 103. For example, Communication management component 130 may include one or more buses, and may further include transmit chain components and receive chain components associated with a transmitter and receiver, respectively, operable for interfacing with external devices. The guide vehicle controller 125 may also include a vehicle control component 135 for controlling the movements of the automated guide vehicle based on instructions received from the network entity.

Figure 5:
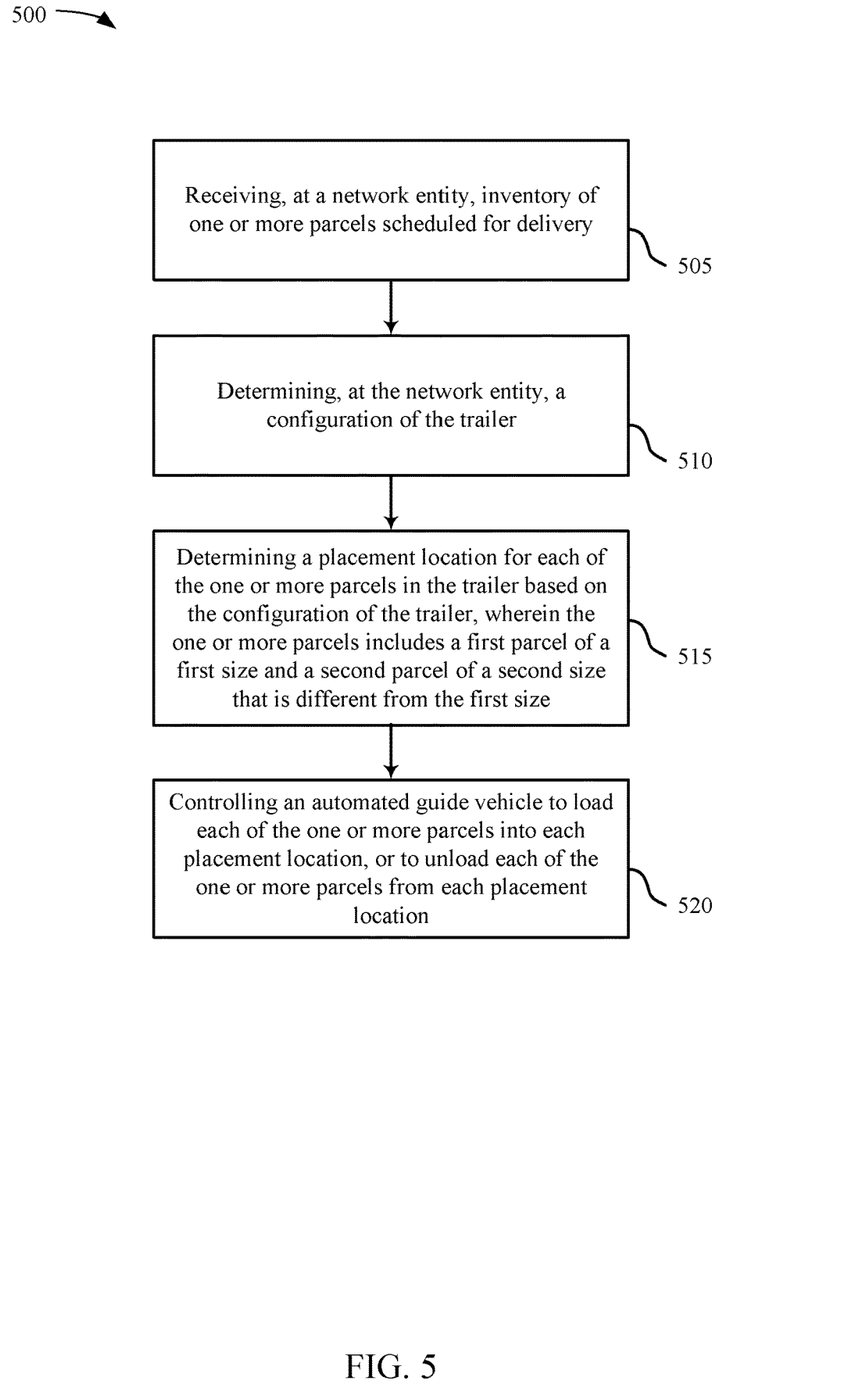
FIG. 5 is a flow chart of an example method implemented by a network entity in accordance with various aspects of the present disclosure.

Referring to FIG. 5, an example method 500 for automatically loading and unloading a truck or a trailer in accordance with aspects of the present disclosure may be controlled by a remote network entity that provides instructions to an automated guide vehicle 103 to load or unload the one or more parcels 210. Although the method 500 is described below with respect to the elements of a remote network entity, other components may be used to implement one or more of the steps described herein.

At block 505, the method may include receiving, at a network entity, inventory of one or more parcels scheduled for delivery. In some examples, the parcel inventory component 425 may identify each pallet, container, or box that needs to be shipped. The one or more parcels 210 may include a tracking identifier 315 for tracking the location of the parcels 210 through the loading (or unloading) process. Examples of tracking identifier 315 may include, but are not limited to, one or more of a label, a bar code, a QR code, a radio frequency identifier tag, a NFC device, or any other mechanism that allows an individual parcel 210 or a group of parcels 210 to be identified and located via visual or radio communication mechanisms. In some examples, the network entity (e.g., automatic loading and unloading device 110) may also receive the dimensions or size of each parcel 210. Based on the tracking identifier 315, the automatic loading and unloading system may be aware of the exact location in the warehouse that the parcel is located. Aspects of block 505 may be performed by parcel inventory component 425 described with reference to FIG. 4A.

At block 510, the method may include determining, at the network entity, a configuration of the trailer. In some examples, the cabin mapping component 430 may identify the configuration of the trailer by mapping the trailer cabin to identify the dimensions of the cabin, including identifying any obstacles (e.g., tire inlay in the trailer) that may be unique to each truck or trailer. In some aspects, the network entity may store the cabin information for various trucks and trailers in its database to aid in plotting the locations of each parcel inside the trailer. Aspects of block 510 may be performed cabin mapping component 430 described with reference to FIG. 4A.

At block 515, the method may include determining a placement location for each of the one or more parcels in the trailer based on the configuration of the trailer. The one or more parcels includes a first parcel of a first size and a second parcel of a second size that is different from the first size. While determining the placement location, the automatic loading and unloading system 115 may consider the dimensions of the one or more parcels before plotting the location in the trailer cabin for the first parcel and the second parcel that maximizes the capacity of the cabin. Additionally or alternatively, the plotting may include identifying the route an automatic guided vehicle may utilize from the storage location of the parcel (e.g., first parcel) to the loading location (e.g., location in the trailer). Such information may also identify the precise angle that the guided vehicle would need to enter the opening of the truck to fit the parcel. Aspects of block 515 may be performed by the parcel plotting component 435 described with reference to FIG. 4A.

At block 520, the method may include controlling an automated guide vehicle to load each of the one or more parcels into each placement location, or to unload each of the one or more parcels from each placement location. In some examples, the automated loading and unloading system may control the guide vehicle by transmitting instructions to the guide vehicle to execute. Thus, in some examples, the automated guide vehicle 103 may include one or more parcel identifier devices 330 to identify the location of the one or more parcels 210 and be guided to the location based on the instructions from the automatic loading and unloading device 115. Suitable examples of the one or more parcel identifier devices 330 may include, but are not limited to, one or more of: a vision system (e.g., one or more cameras and image recognition software) to read a label, bar code, or QR code; a radio communication system, such as a RFID or NFC transponder and/or reader; and a position/location system, such as a satellite- and/or terrestrial-based geographic positioning system, which may be able to verify that a current location matches a given location for a respective parcel 210. For instance, in an RFID example, based on the information in an RFID signal 320 emitted by the tracking identifier 315 in the form of an RFID tag (in response to a transmission from an RFID transponder that awakens the tag) attached to each parcel 210. Aspects of block 520 may be performed by the guided vehicle control component 440 described with reference to FIG. 4A.

Figure 6:
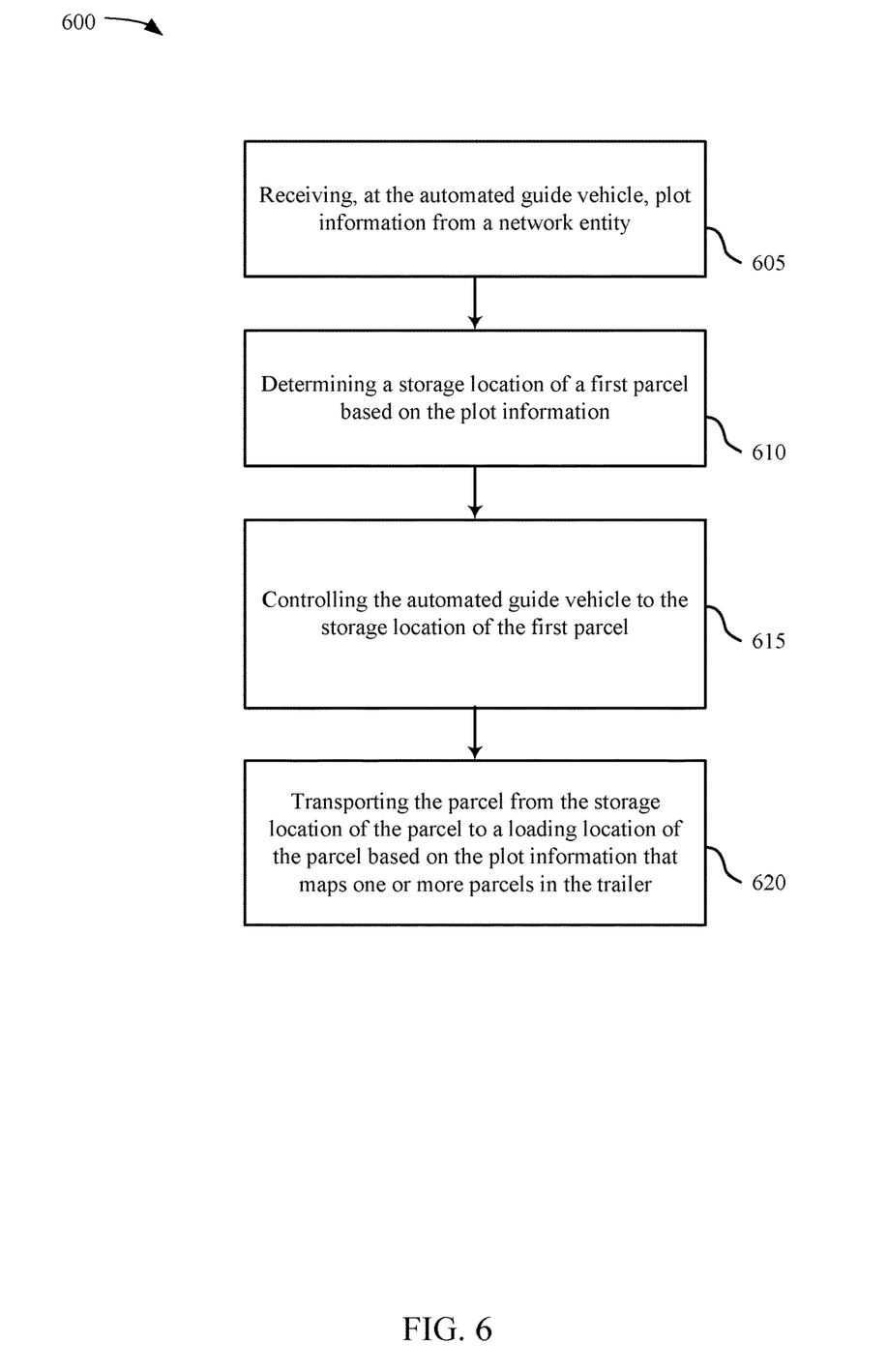
FIG. 6 is a flow chart of an example method implemented by the automated guide vehicle in accordance with various aspects of the present disclosure.

Referring to FIG. 6, an example method 600 for automatically loading and unloading a truck or a trailer in accordance with aspects of the present disclosure may be performed by an automated guide vehicle operating without user input.

At block 605, the method may include receiving, at the automated guide vehicle, plot information from a network entity. Aspects of block 605 may be performed by communication management component 130 described with reference to FIGS. 1 and 4B.

At block 610, the method may include determining a storage location of a parcel based on the plot information. In some examples, the storage location of the parcel may be determined based on combination of the parcel identifier 330 and the routing information from the automatic loading and unloading device 115, the automated guide vehicles 103 may be routed to the one or more parcels 210, such as being directed to a storage location for pickup. For example, the routing information may include an exact route to the storage location, and/or may include the storage location identified by GPS coordinates. The automated guide vehicles 103 may take a route through a building or stockyard based on the exact route or based on known obstacles between a current location and the location corresponding to the GPS coordinates, and then locate and identify a respective parcel 210 using one or more parcel identifier devices 330. Aspects of block 610 may be performed by parcel identification component 455 described with reference to FIG. 4B.

At block 615, the method may include controlling the automated guide vehicle to the storage location of the parcel. Aspects of block 615 may be performed by vehicle control component 135 described with reference to FIGS. 1 and 4B.

At block 620, the method may include transporting the parcel from the storage location of the parcel to a loading location of the parcel based on the plot information that maps planned location of one or more parcels in the trailer. In some examples, the network entity may verify the loading of the one or more parcels by the automated guide vehicle based on a camera mounted in the trailer of the truck. Accordingly, if the automated guide vehicle deviates from a mapped plan of the cabin (e.g., if the loading location of the parcel exceeds a predetermined threshold distance from the planned location of the parcel), the network entity may transmit instructions to the automated guide vehicle to correct the error in the loading. Thus, in some aspects, the guide vehicle controller 125 may receive instructions from the network entity that identify a loading error. The instructions may require the automated guide vehicle 103 to adjust the loading location of the parcel. For example, the automated guide vehicle may pick up the parcel from the loading location to the planned location based on the correction instructions transmitted by the network entity. As such, the network entity may monitor visual data from the camera to ensure that the automated guide vehicle is loading (and unloading) the truck based on the mapped information. Aspects of block 620 may be performed by vehicle control component 135 described with reference to FIG. 1.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for automated loading and unloading of a trailer, comprising:
   receiving, at a network entity, inventory of one or more parcels scheduled for delivery;
   determining, at the network entity, a configuration of the trailer;
   determining a placement location for each of the one or more parcels in the trailer based on the configuration of the trailer,
   wherein the one or more parcels includes a first parcel of a first size and a second parcel of a second size that is different from the first size;
   controlling an automated guide vehicle, using plot information received from the network entity, to load each of the one or more parcels into each placement location; and
   verifying, at the network entity, the loading of the one or more parcels by the automated guide vehicle based on a vision system in the trailer, wherein the verifying the loading of the one or more parcels comprises determining an error in the loading based on the verification by the vision system and transmitting instructions, from the network entity to the automated guide vehicle, to correct the error in the loading,
   wherein the automated guide vehicle obtains the one or more parcels outside of the trailer and loads the one or more parcels inside of the trailer.

2. The method of claim 1, wherein each of the one or more parcels include a tracking identifiers to identify and enable tracking of a location of each of the one or more parcels.

3. The method of claim 1, wherein controlling the automated guide vehicle to load each of the one or more parcels into the trailer comprises:
   identifying a route for the automated guide vehicle from a current location of the one or more parcels to the corresponding placement location inside the trailer; and
   transmitting the route from the network entity to the automated guide vehicle,
   wherein the route is included in the plot information.

4. The method of claim 1, wherein controlling the automated guide vehicle to load each of the one or more parcels into the trailer comprises:
   determining an orientation and an angle of entry into the trailer for the automated guide vehicle;
   transmitting the orientation and the angle of entry information to the automated guide vehicle for loading the trailer.

5. The method of claim 1, wherein determining the placement location for each of the one or more parcels in the trailer based on the configuration of the trailer comprises:
   determining dimensions of each of the one or more parcels; and
   determining each placement location based on the dimensions of each of the one or more parcels.

6. The method of claim 1, wherein the verifying comprises the vision system in the trailer identifying a package location based on triangulating signals from the parcel.

7. The method of claim 6, wherein the verifying the loading of the one or more parcels by the automated guide vehicle based on the vision system comprises:
   receiving, at the network entity, visual data from the vision system;
   identifying the one or more parcels being transported by the automated guide vehicle based on the visual data;
   determining a loading location of the one or more parcels; and
   determining whether the loading location exceeds a predetermined threshold from a planned location.

8. An apparatus for automated loading and unloading of a trailer, comprising:
   a processor;

a memory coupled to the processor, wherein the memory includes instructions executable by the processor to:

receive, at a network entity, inventory of one or more parcels scheduled for delivery;

determine, at the network entity, a configuration of the trailer;

determine a placement location for each of the one or more parcels in the trailer based on the configuration of the trailer, wherein the one or more parcels includes a first parcel of a first size and a second parcel of a second size that is different from the first size;

control an automated guide vehicle, based on plot information received from the network entity, to load each of the one or more parcels into each placement location; and verify, at the network entity, the loading of the one or more parcels by the automated guide vehicle based on a vision system in the trailer, wherein the verify the loading of the one or more parcels comprises determining an error in the loading based on the verification by the vision system and transmitting instructions, from the network entity to the automated guide vehicle, to correct the error in the loading, wherein the automated guide vehicle obtains the one or more parcels outside of the trailer and loads the one or more parcels inside of the trailer.

9. The apparatus of claim 8, wherein each of the one or more parcels include a tracking identifiers to identify and enable tracking of a location of each of the one or more parcels.

10. The apparatus of claim 8, wherein the instructions for controlling the automated guide vehicle to load each of the one or more parcels into the trailer are further executable by the processor to:

identify a route for the automated guide vehicle from a current location of the one or more parcels to the corresponding placement location inside the trailer; and transmit the route from the network entity to the automated guide vehicle, wherein the route is included in the plot information.

11. The apparatus of claim 8, wherein the instructions for controlling the automated guide vehicle to load each of the one or more parcels into the trailer are further executable by the processor to:

determine an orientation and an angle of entry into the trailer for the automated guide vehicle;

transmit the orientation and the angle of entry information to the automated guide vehicle for loading the trailer.

12. The apparatus of claim 8, wherein the verification comprises the vision system in the trailer identifying a package location based on triangulating signals from the parcel.

13. A non-transitory computer readable medium for automated loading and unloading of a trailer, comprising code for:

receiving, at a network entity, inventory of one or more parcels scheduled for delivery;

determining, at the network entity, a configuration of the trailer;

determining a placement location for each of the one or more parcels in the trailer based on the configuration of the trailer, wherein the one or more parcels includes a first parcel of a first size and a second parcel of a second size that is different from the first size;

controlling an automated guide vehicle, based on plot information received from the network entity, to load each of the one or more parcels into each placement location; and verifying, at the network entity, the loading of the one or more parcels by the automated guide vehicle based on a vision system in the trailer, wherein the verifying the loading of the one or more parcels comprises determining an error in the loading based on the verification by the vision system and transmitting instructions, from the network entity to the automated guide vehicle, to correct the error in the loading, wherein the automated guide vehicle obtains the one or more parcels outside of the trailer and loads the one or more parcels inside of the trailer.

14. The non-transitory computer readable medium of claim 13, wherein each of the one or more parcels include a tracking identifiers to identify and enable tracking of a location of each of the one or more parcels.

15. The non-transitory computer readable medium of claim 13, wherein the code for controlling the automated guide vehicle to load each of the one or more parcels into the trailer further includes code for:

identifying a route for the automated guide vehicle from a current location of the one or more parcels to the corresponding placement location inside the trailer; and transmitting the route from the network entity to the automated guide vehicle.

16. The non-transitory computer readable medium of claim 13, wherein the code for controlling the automated guide vehicle to load each of the one or more parcels into the trailer further includes code for:

determining an orientation and an angle of entry into the trailer for the automated guide vehicle;

transmitting the orientation and the angle of entry information to the automated guide vehicle for loading the trailer.

17. The non-transitory computer readable medium of claim 13, wherein the verifying comprises the vision system in the trailer verifying a package location based on triangulating signals from the parcel.

* * * * *